United States Patent [19]

Schulze

[11] Patent Number: 5,389,583
[45] Date of Patent: Feb. 14, 1995

[54] PROCESS FOR THE PREPARATION OF A SILICATE-BOUND MATERIAL

[75] Inventor: Gisbert Schulze, Lauf, Germany

[73] Assignee: Hoechst CeramTec Aktiengesellschaft, Selb, Germany

[21] Appl. No.: 130,087

[22] Filed: Sep. 20, 1993

Related U.S. Application Data

[63] Continuation of Ser. No. 724,720, Jul. 2, 1991, abandoned.

[30] Foreign Application Priority Data

Jul. 4, 1990 [DE] Germany ............... 4021288

[51] Int. Cl.⁶ ............................... C03C 8/14
[52] U.S. Cl. ....................... 501/17; 264/56; 501/32
[58] Field of Search .................. 264/56; 501/153, 127, 501/128, 129, 130, 17, 32

[56] References Cited

U.S. PATENT DOCUMENTS

| | | | |
|---|---|---|---|
| 3,585,056 | 6/1971 | Bush | 106/45 |
| 3,929,496 | 12/1975 | Asano et al. | 501/153 |
| 4,265,669 | 5/1981 | Starling et al. | 106/73.4 |
| 4,332,913 | 6/1982 | Bock | 501/144 |
| 4,348,236 | 9/1982 | Hines, Jr. et al. | 106/38.27 |

FOREIGN PATENT DOCUMENTS

| | | |
|---|---|---|
| 0354304 | 2/1990 | European Pat. Off. . |
| 0378275 | 7/1990 | European Pat. Off. . |
| 2478073 | 9/1981 | France . |
| 85-233130 | 8/1985 | Japan . |
| 2143515 | 2/1985 | United Kingdom . |

*Primary Examiner*—James Derrington
*Attorney, Agent, or Firm*—Foley & Lardner

[57] ABSTRACT

To prepare a ceramic molded article based on silicate or based on alumina, a ceramic starting material containing clay, kaolin, steatite and/or alumina is mixed with a silicate-containing flux, the mixture is made into a molded article and the molded article is heated and dense-sintered. At least some of the flux used is composed of a preferably alkali metal-free glass frit whose beginning of softening is above 850° C.

Advantageously, an alkali metal-free boron silicate glass is used in amounts of 0.1–20% by weight of the starting mixture. This process makes it possible to prepare, inter alia, ceramic molded articles comprising a glass phase and a crystalline portion substantially containing $Al_2O_3$, in which the glass phase content is 22–34% by weight and comprises 50–68% by weight of $SiO_2$, 12–22% of $Al_2O_3$, 0.1–4.5% of $Fe_2O_3$, 0.1–13% of $TiO_2$, 0.1–23% of CaO, 0.1–9% of MgO, 0–7% of $Na_2O$, 0–11% of $K_2O$, 0–9% of BaO and 0–23% of $B_2O_3$ and the crystalline portion comprises 1–25% of $SiO_2$, 70–80% of $Al_2O_3$, 0.1–1% of $Fe_2O_3$, 0.1–3% of $TiO_2$, 0.1–5% of CaO, 0.1–2% of MgO, 0–1.5% of $Na_2O$, 0–2.5% of $K_2O$, 0–2% of Bao and 0–5% of $B_2O_3$.

19 Claims, No Drawings

PROCESS FOR THE PREPARATION OF A SILICATE-BOUND MATERIAL

This application is a continuation of application Ser. No. 07/724,720, filed Jul. 2, 1991, now abandoned.

The present invention relates to a process for the preparation of a ceramic molded article based on silicate or based on alumina with the use of a glass frit.

Apart from the high temperature resistance, one of the outstanding properties of ceramic materials is their electrical insulating capacity. Moreover, in some cases good mechanical strength, in particular bending strength, is desirable.

Industrial ceramics based on silicate and based on alumina are usually dense-sintered during the firing process with the formation of a glass phase.

In order to form the glass phase, it is customary to introduce feldspars and nepheline syenite and in rarer cases alkaline earth metal compounds (such as barium carbonate) into the batch. These components form melts by heating alone or by reactions with other components of the batch and solidify upon cooling in the form of glass.

The electrical properties of such materials, in particular at elevated temperatures, strongly depend on the amount of the alkali metal ions present in the material.

It is true that feldspars are cheap; but their great disadvantage is the high alkali content of the glass phase. Especially at elevated temperatures, the electrical properties, in particular the volume resistivity of ceramics which have been dense-sintered and are based on feldspar, are very adversely affected.

If it is desired to obtain products having good electrical properties, in particular high volume resistivity at elevated temperatures, either the proportion of the glass phase must be kept low and/or the fluxes containing alkali metals must be replaced by those containing alkaline earth metals. (See Salmang-Scholze, Keramik (Ceramics), 5th edition, page 371).

The bending strength of silicate-bound ceramics is also affected by the type and amount of the glass phase formed. Reactivity, viscosity during sintering, wetting behavior and the thermal expansion coefficient of the glass phase and its mechanical strength have an effect on the strength of the fired article.

The object was therefore to increase the electrical properties, in particular the volume resistivity at elevated temperatures and the bending strength of silicate materials (and alumina materials) of technical ceramics above the known level.

The invention is based on the observation that the desired properties can be improved by complete or partial replacement of feldspar and nepheline syenite with glass frits, in particular frits of glasses free of alkali metals.

A process for the preparation of a ceramic molded article based on silicate or based on alumina has now been found in which a ceramic starting material containing clay, kaolin, steatite and/or alumina is mixed with a silicate-containing flux, the mixture is made into a molded article, the molded article is heated and dense-sintered at temperatures of above 1,100° C., preferably 1,200°–1,450° C., in particular 1,280°–1,350° C. In this process, at least some of the flux used is composed of a glass frit. The glass frit used is preferably free of alkali metals. With less stringent requirements on the resistivity at elevated temperatures, the flux used can contain at least one alkali metal-containing feldspar containing alkali melts or nepheline syenite, in addition to the glass frit.

Glass frits are solidified glass melts which are usually produced by quenching in water and, in the form of glass flakes or finely ground material, are starting materials for glazes or similar applications. This means that glass frits are comminuted glass and can contain alkali metals or can be free of alkali metals. The alkali metal content of the frit used depends on the requirements made on the material. Frits which are free of alkali metals are used when a maximum volume resistivity is desired at elevated temperatures, such as, for example, 600° C. Of the frits containing alkali metals, those which are free of lithium are preferred. The beginning of softening of the glass phase used is above 850° C., preferably above 895° C.

The mixture is shaped into a molded article in a manner known per se, for example by preparing an aqueous slip, the green body being formed by absorbing the liquid phase in a porous gypsum mold or by extrusion of a ceramic composition provided with organic plasticizers.

The process according to the invention makes it possible to prepare a porcelain if the starting material contains kaolin, quartz and feldspar. When alumina porcelains are prepared, alumina must also be present in addition to these materials. When steatite articles are prepared, the ceramic starting material must contain clay, feldspar or $BaCO_3$ and mainly steatite. If moreover $Mg(OH)_2$ is added, forsterite is formed. If the starting material used is olivine, the product obtained is also forsterite. Cordierite articles made of clay, kaolin, steatite or magnesium hydroxide and alumina can also be prepared by the process according to the invention. The addition of feldspar leads to compact articles. The preparation of cordierite articles is not preferred. Molded articles made of aluminum silicate, i.e. containing no magnesium oxide, can also be prepared by the process according to the invention. In particular materials based on aluminum silicate which are mullite ceramics can be obtained in this manner. In this case, the mixture of the starting materials contains at least 50% by weight, in particular 50 to 80% by weight, of $Al_2O_3$. If the composition of the starting material is 80 to 96% by weight of $Al_2O_3$, materials having a high alumina content are formed.

Compact as well as porous materials of industrial ceramics containing silicate batch components from C groups 100, 200, 400, 500 and 600 and to a limited extent up to high-percentage alumina usually contain varying amounts of batch components which upon firing form glass phases.

Replacing feldspar and/or nepheline syenite by glass frit which is free of alkali metals has a favorable effect on the volume resistivity at elevated temperatures. However, for increasing the bending strength, it is sensible not to replace the feldspar or nepheline syenite originally present in the batch completely by glass frit but only some of it.

The glass frit content in the green molded article is preferably 0.2 to 20% by weight, in particular 6 to 13% by weight. The alkali metal-containing flux nepheline syenite is a rock which mainly comprises nepheline and in addition to that another 0 to 50% by weight of other alkali metal-containing feldspar.

The flux used preferably contains at least one other component which supplies alkaline earth metal oxide, for example wollastonite, dolomite, marble, bariumcarbonate, strontium carbonate or steatite. The use of the flux component $BaCO_3$ is preferred. Titanium dioxide can be added to the flux as further component. The weight ratio (feldspar+nepheline syenite)/glass frit is preferably 0:1 to 0.7:1.

For many electrical areas of application, materials having high alumina contents are increasingly being used, since the strength of porcelain and special steatite is often no longer sufficient. Many parts are nowadays mounted by means of automatic apparatuses requiring higher strength reserves of the material, for example during riveting. The process according to the invention allows materials of this type to be prepared, even those made of porcelain and special steatite.

The large group of alumina porcelains having $Al_2O_3$ contents of up to about 85% does often not meet the electrical requirements, owing to their (compared with special steatite or high-percentage alumina) higher alkali metal content, or these materials already require significantly higher firing temperatures than special steatite when fluxes containing alkali metals are reduced or replaced, for example, by alkaline earth metal compounds.

The addition of 0.5% of alkali metal-free frit to a porous batch from group C520 (according to DIN SDE 0335, Part 3) increases the bending strength.

In order to reach a volume resistivity of more than $10^7$ Ohm cm at 600° C. in the case of materials from groups C610, C620 or C780, the alkali metal content in the batch must be less than 1% by weight of $M_2O$.

The replacement according to the invention of the alkali metal-containing feldspar and nepheline syenite by glass frit, in particular the frit of alkali metal-free glasses, can improve the properties of many traditional materials of technical ceramics having a low $Al_2O_3$ content, in particular the C group 600 according to DIN VDE 0335, Part 3, to such an extent that they are suitable for many applications which otherwise are covered by high-percentage alumina. The advantage of these compositions is that they allow the use of considerably lower firing temperatures and their raw material costs are lower, since their alumina content is lower than that of $Al_2O_3$ materials having a high $Al_2O_3$ content.

By virtue of the increase in the mechanical strength obtainable by the process according to the invention, it is possible, for example, to manufacture a variety of machine structural components at cheaper raw material and firing costs. By maintaining a low alkali metal content, a wider range of uses for electrical applications is achieved, such as, for example, for ignition electrodes.

As mentioned above, the ceramic starting material can contain 0.2 to 20% by weight of a glass frit. Moreover, it can contain 0 to 12% by weight of feldspar+-nepheline syenite, 0 to 5% by weight of steatite and 0 to 3% by weight each of wollastonite, dolomite, ground marble, barium carbonate and titanium dioxide. The total amount of flux, i.e. sintering aid, should however not exceed a maximum of 30% by weight. The use of dolomite, marble, wollastonite, barium carbonate, feldspar and nepheline syenite is known from German Patent No. 2,932,914.

The process according to the invention makes it possible to prepare ceramic molded articles having very favorable properties. They comprise a glass phase and a crystalline portion substantially containing $Al_2O_3$. The glass phase content is in particular 22–34% by weight, which itself comprises 50–68% by weight of $SiO_2$, 12–22% of $Al_2O_3$, 0.1–4.5% of $Fe_2O_3$, 0.1–13% of $TiO_2$, 0.1–23% of CaO, 0.1–9% of MgO, 0–7% of $Na_2O$, 0–11% of $K_2O$, 0–9% of BaO and 0–23% of $B_2O_3$ and the crystalline portion comprises 10–25% of $SiO_2$, 70–80% of $Al_2O_3$, 0.1–1% of $Fe_2O_3$, 0.1–3% of $TiO_2$, 0.1–5% of CaO, 0.1–2% of MgO, 0–1.5% of $Na_2O$, 0–2.5% of $K_2O$, 0–2% of Bao and 0–5% of $B_2O_3$.

The invention is illustrated by the examples which follow.

|  | Example 1 Material without glass frit | Example 2 Material with glass frit | Example 3 Material with glass frit |
|---|---|---|---|
| Clay | 15 | 15 | 15 |
| Bentonite | 2 | 2 | 2 |
| Corundum | 34.5 | 34.5 | 34.5 |
| Alumina | 34 | 34 | 34 |
| Steatite | 1 | 1 | 1 |
| Dolomite | 1 | 1 | 1 |
| Nepheline syenite | 4.5 | 1.5 | — |
| Feldspar | 8 | — | — |
| Glass frit | — | 11 | 12.5 |
| Bending strength | 240 (N/mm$^2$) | 350 | 290 |
| Volume resistivity |  |  |  |
| at 200° C. | $10^8$ (Ohm.cm) | $10^{12}$ | $10^{13}$ |
| at 600° C. | $10^4$ (Ohm.cm) | $10^7$ | $10^7$ |

Example 1 is a comparative example, while Examples 2 and 3 are according to the invention.

In Examples 2 and 3, a boron glass frit containing 33% by weight of $SiO_2$, 9.4% by weight of $Al_2O_3$, 32% by weight of $B_2O_3$ and 26% by weight of CaO was used. The hemisphere temperature was 960° C., and the thermal expansion coefficient (20/400° C.) was $6.6 \times 10^{-6}$/K. The highest bending strength was obtained in Example 2, in which—in contrast to Example 1—feldspar was completely replaced and nepheline syenite in part by boron glass of the composition given. Although the volume resistivity at 200° C. increases when feldspar and nepheline syenite are completely replaced by boron glass, the bending strength decreases again somewhat.

In Examples 4 and 5, a glass frit containing 56% of $SiO_2$, 11% of $Al_2O_3$, 23% of $B_2O_3$, 5.5% of CaO and 5% of BaO (each in % by weight) was used. The hemisphere temperature of the glass frit was 1280° C. The thermal expansion coefficient (20/400° C.) was only $4.10^{-6}$/K.

|  | Example 4 Material without glass frit | Example 5 Material with glass frit |
|---|---|---|
| Clay | 10 | 10 |
| Steatite | 2 | 2 |
| Wollastonite | 1 | 1 |
| Nepheline syenite | 6 | 7 |
| Feldspar | 11 | — |
| Alumina | 70 | 70 |
| Glass frit | — | 10 |
| Bending strength | 200 (N/mm$^2$) | 330 |

Example 4 is a comparative example. Example 5 is according to the invention. The complete replacement of feldspar by glass frit markedly increases the bending strength.

What is claimed is:

1. A process for the preparation of a ceramic molded article comprising the steps of:
   a) admixing a silicate or alumina-based ceramic starting material comprising at least one of a clay other than kaolin, kaolin, steatite, and alumina, with a silicate-containing flux which is substantially free of feldspar, wherein the flux comprises nepheline syenite and alkali metal-free glass frit having a beginning softening point of above 850° C., wherein the weight ratio of nepheline syenite to glass frit in the flux is from 0.1 to 0.7:1 so as to form a mixture,
   b) shaping the mixture into a green molded article, wherein the green molded article contains 0.2 to 20% by weight of the glass frit and 1.5 to 7% by weight of nepheline syenite and
   c) heating and dense-sintering the molded article at a temperature of above 1100° C.

2. The process as claimed in claim 1, wherein the alkali metal-free glass frit is a boron silicate glass.

3. The process as claimed in claim 1, wherein the flux contains at least one of the components selected from the group consisting of steatite, wollastonite, dolomite, marble, barium carbonate, and titanium dioxide.

4. The process as claimed in claim 1, wherein the composition of the mixture of the ceramic starting materials is selected such that an article composed of porcelain, steatite, forsterite, cordierite, aluminum silicate or magnesium silicate is formed.

5. The process as claimed in claim 1, wherein the mixture of the ceramic starting material contains at least 50% by weight of $Al_2O_3$.

6. The process as claimed in claim 5, wherein the composition of the ceramic starting material contains 80 to 99% by weight of $Al_2O_3$.

7. The process as claimed in claim 5, wherein the composition of the mixture of the ceramic starting materials is selected such that a mullite article is formed.

8. The process as claimed in claim 1, wherein the molded article is sintered in step c) at temperatures of 1,200° to 1,450° C.

9. The process as claimed in claim 8, wherein the molded article is sintered in step c) at temperatures of 1,280° to 1,350° C.

10. The process as claimed in claim 2, wherein the alkali metal-free boron silicate glass content is 6 to 10% by weight of the starting mixture.

11. The process as claimed in claim 1, wherein the glass frit has a beginning softening point of above 895° C.

12. The process as claimed in claim 1, wherein the green molded article contains 6 to 13% by weight of the glass frit.

13. The process as claimed in claim 1, wherein the flux further comprises barium carbonate.

14. The process as claimed in claim 1, wherein the amount of the flux in the molded green body does not exceed 30% by weight.

15. The process as claimed in claim 1, wherein the produced ceramic article comprises a glass phase and a crystalline portion wherein the glass phase content is 22–34% by weight and comprises 50–68% by weight of $SiO_2$, 12–22% of $Al_2O_3$, 0.1–4.5% of $Fe_2O_3$, 0.1–13% of $TiO_2$, 0.1–23% of CaO, 0.1–9% of MgO, 0–7% of $Na_2O$, 0–11% of $K_2O$, 0–9% of BaO and 0–23% of $B_2O_3$, and the crystalline portion comprises 10–25% of $SiO_2$, 70–80% of $Al_2O_3$, 0.1–1% of $Fe_2O_3$, 0.1–3% of $TiO_2$, 0.1–5% of CaO, 0.1–2% of MgO, 0–1.5% of $Na_2O$, 0–2.5% of $K_2O$, 0–2% of BaO and 0–5% of $B_2O_3$.

16. The process as claimed in claim 1, wherein the molded article is formed from clay, alumina, steatite, and dolomite.

17. The process as claimed in claim 1, wherein the molded article is formed from clay, steatite, alumina, and wollastonite.

18. The process as claimed in claim 1 wherein the green molded body comprises 1 to 2% by weight of steatite and 34–70% by weight of alumina.

19. The process as claimed in claim 1 wherein the green molded body contains 10 to 11% by weight of glass frit.

* * * * *